Sept. 20, 1971 K. E. MAYO 3,605,720

HEAT SOURCE SYSTEMS

Filed March 16, 1970 5 Sheets-Sheet 1

INVENTOR.
KENNETH E. MAYO
BY
ATTORNEY

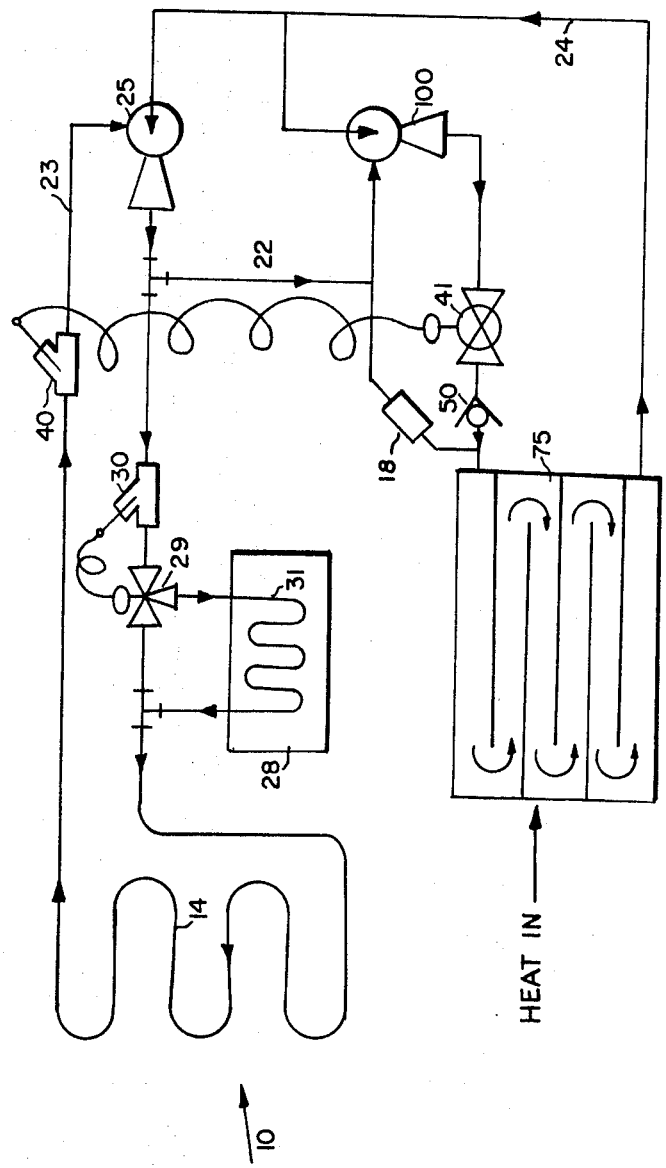

INVENTOR.
KENNETH E. MAYO

Sept. 20, 1971  K. E. MAYO  3,605,720
HEAT SOURCE SYSTEMS

Filed March 16, 1970  5 Sheets-Sheet 4

INVENTOR.
KENNETH E. MAYO
BY
Richard J. Seligman
ATTORNEY

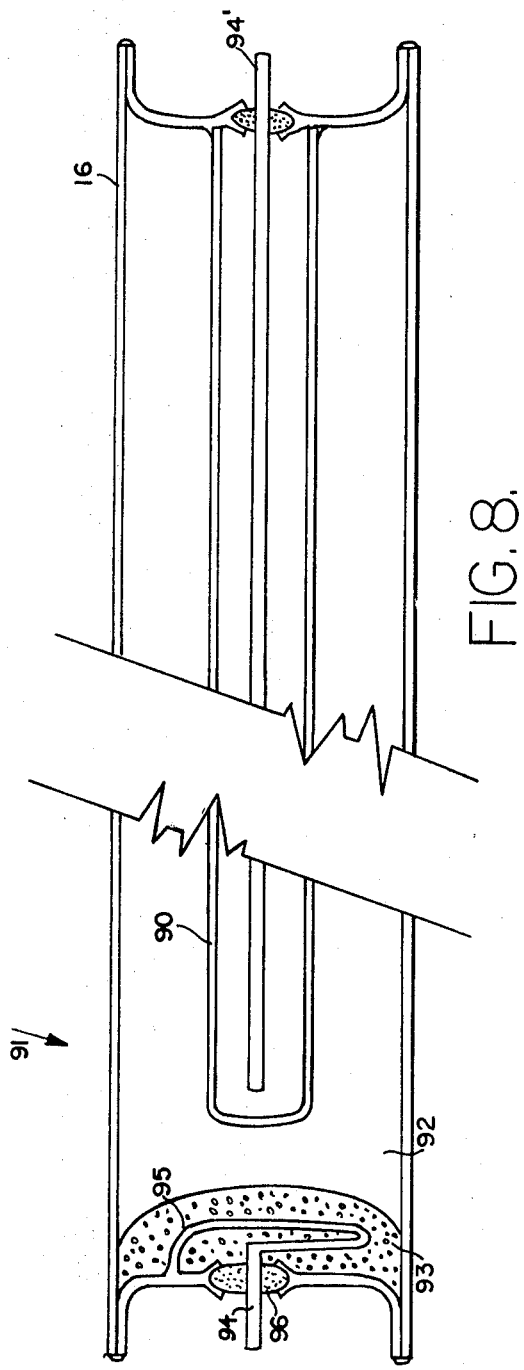

United States Patent Office 3,605,720
Patented Sept. 20, 1971

3,605,720
HEAT SOURCE SYSTEMS
Kenneth E. Mayo, Nashau, N.H., assignor to
Sanders Nuclear Corp., Nashua, N.H.
Filed Mar. 16, 1970, Ser. No. 19,879
Int. Cl. B63c 11/28; F24h 7/02; F24j 1/00
U.S. Cl. 126—263
24 Claims

ABSTRACT OF THE DISCLOSURE

High thermal energy density rate controlled heat source systems particularly suitable for use in heated underwater diver suits and portable thermal conditioning jackets are provided. The heat source system has a mass of chemical reactants selected to provide a highly exothermic chemical reaction devoid of gaseous by-products. A high heat of fusion material surrounds the mass of reactants and acts as a heat storage unit for dissipating heat at a controlled rate which heat is obtained from the exothermic reaction. Preferably means are provided in operative relationship to the high heat of fusion material for transferring the heat from the material to a moving fluid such as a liquid which is heated at a controlled rate and passed into a body heating suit of an underwater diver. Preferably the last-mentioned means comprises a boiler and a steam injector which is useful for providing pumping action as well as regulating the temperature of the fluid so that batteries or electric power are not required to provide either heat or pumping (circulation power).

BACKGROUND OF THE INVENTION

Many heat source systems have been devised for underwater and portable use in body heating garments by underwater divers and the like. The heat source systems are often electrically heated or heated by hot water carried by hoses from stationary heat sources. Such systems often suffer from one or more of the following problems, difficulty of control, large size, cumbersome umbilical connections, heavy weight, outgassing of vent gases, long time periods for re-charging, short circuits, storage difficulties, battery weight and cost, and in some cases, formation of dangerous by-products.

Chemical heating means have been known for various uses and include mixtures of potassium chlorate and iron which combine at a predetermined ignition temperature producing an exothermic reaction which is extremely difficult to control at usable heat production rates.

It is a primary object of this invention to provide usable heat source means for dissipation of heat stored at a high density with a controlled use rate.

Another object of this invention is to provide a heat source means in accordance with the preceding object which is highly versatile and particularly suitable for use as the heat source of a diver heating system.

Another object of this invention is to provide a heat source system particularly useful for body heating of divers which system is small in size, light-in-weight, storable and can easily and efficiently handle thermal peak loads and which can be used intermittently or continuously throughout its operating capacity period.

Another object of this invention is to provide a portable long storage life system which can silently provide thermal power at a moment's notice from a very high energy storage density source such that the thermal energy can be released at a desired high temperature at a desired rate for heating objects or for providing electrical, mechanical or thermal power.

Still another object of this invention is to provide a heat source system in accordance with the preceding objects which is relatively maintenance-free in use, reliable and safe.

SUMMARY OF THE INVENTION

According to the invention a storable heat source system comprises a mass of chemical reactants selected to provide a highly exothermic reaction upon activation at a predetermined temperature, which reaction is preferably devoid of any gaseous by-products and preferably results in reaction products no longer in volume than the volume of said reactants. A high heat of fusion material surrounds the mass on good heat conductive transfer relation ship therewith and acts as a thermal energy storage medium. Means are provided in operative relationship with the high heat of fusion material for transferring heat from said material to a moving fluid.

In the preferred embodiment, the reactants comprise at least one compound selected from the group consisting of alkali metal chlorates, alkali metal perchlorates and mixtures thereof, and at least one compound selected from the group consisting of reducing metals such as vanadium, calcium, iron, cobalt, cadmium, beryllium, aluminum, boran and magnesium. In an alternate embodiment of the invention, the reactants are polytetrafluoroethylene and a reducing metal such as magnesium.

The means for transferring heat to a moving fluid is preferably a steam injector pump in combination with a flash evaporator so that heat from the reaction forms steam which is injected into a liquid loop of heat transfer fluid passing to the area to be heated such as the undergarment of a underwater diver. In the preferred embodiment, control and activation means are employed to assure desired operation of the device within desired tolerances and limits.

The heat source system of this invention is particularly suitable for use in heating underwater divers and has extreme ease of operation over long time periods in use. The system is safe and reliable and has low cost replaceable fueling units. It can be operated at water depths in excess of 200 feet and is compatible with salt water. Devices which are lightweight and physically compact such as having over-all weights of 25 pounds with negative buoyancies of less than 5 pounds and sizes of less than 650 cubic inches (6″ x 6″ x 16″) can be easily formed. The systems operate quietly with not gas evolution or formation of toxic products exposed to the user. B.t.u. delivery rates can be adjusted in accordance with desired needs and can be greater than 400–4000 B.t.u. per hour with inlet and exit water temperature controls to a diver suit in the range of 95° to 120° F. or whatever value desired depending upon the conditions in the water about the diver and his metabolic heating rate.

BRIEF DESCRIPTION OF THE DRAWINGS

The above and other features, objects and advantages of the present invention will be better understood from the following specification when read in conjunction with the accompanying drawings in which:

FIG. 2 is a schematic view of the operation thereof;

FIG. 8 is an axial cross sectional view of an alternate embodiment of the invention.

DESCRIPTION OF PREFERRED EMBODIMENTS

Figure 1:
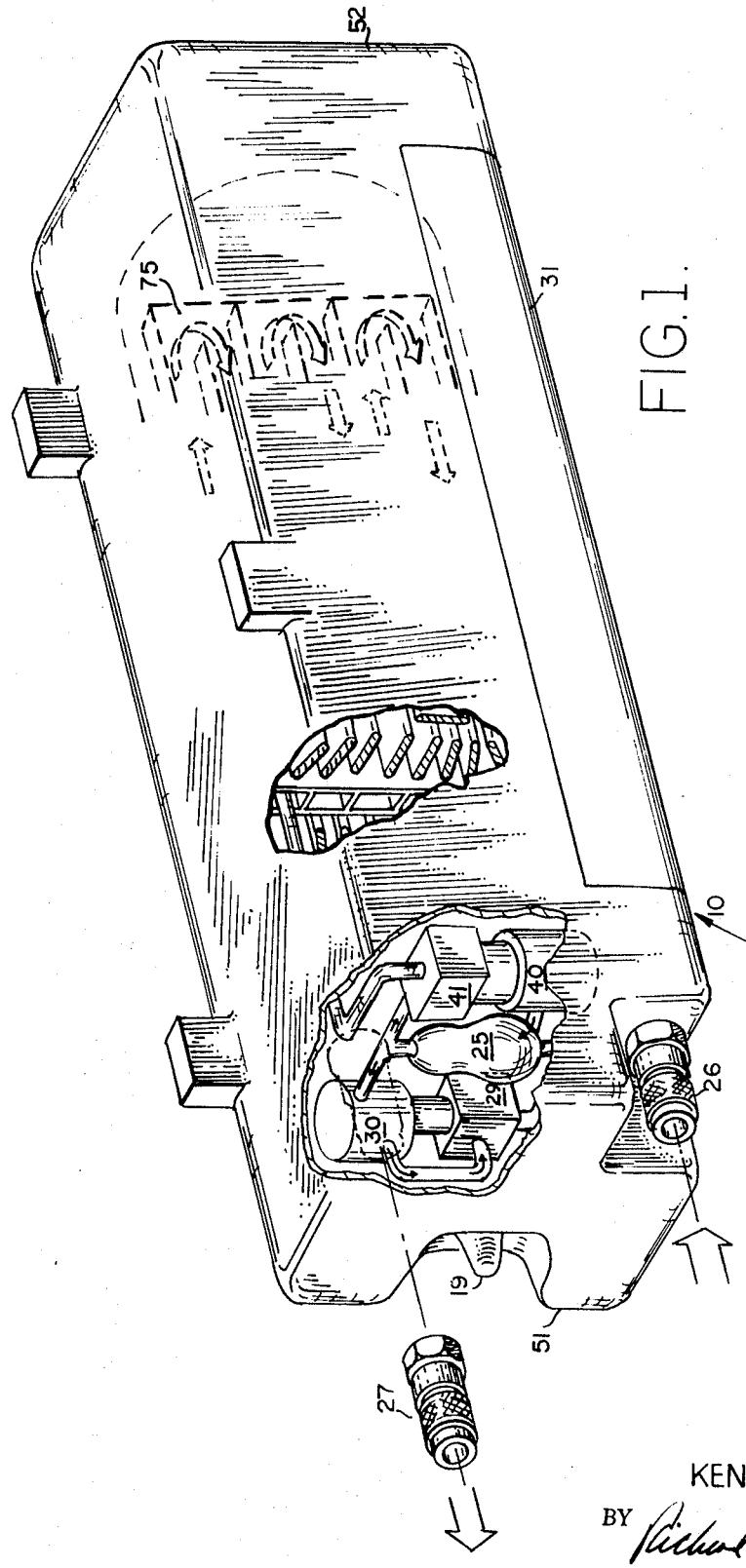
FIG. 1 is a perspective view of a preferred embodiment of this invention with parts removed to show components thereof.

With reference now to the drawings and more particularly FIGS. 1–4, a preferred embodiment of a chemically heated, thermally powered diving suit heater system is illustrated generally at 10 and is made up of two elongated D-shaped heat source modules 11 comprising elongated heat source units 12 and surrounding heat storage medium 13. Interposed between the flat surfaces of the modules 11 is a flash boiler 75 which acts as a part of a means for transferring heat from the modules to a diver's suit 14 which is interconnected with the flash boiler through a series of conduits and control means whereby a fluid such as water is heated and recirculated to the diver's suit in a continuous flow.

The system 10 is designed to provide heating requirements to a diver's suit of from 400 to 4000 B.t.u. per hour although it may have a control range of from 0 to 8000 B.t.u. per hour with an over-all weight of less than 25 pounds and outside dimensions of 6" x 6" x 18". In order to achieve the volumetric and weight requirements, high energy storage density for high and various heat use rates are required. Thus, highly exothermic chemical reactions are used to produce heat and yet achieve complete containment and maximum safety. The heat source modules 11 are formed with heat units or heat sticks 12 comprising chemical reactants selected to provide a highly exothermic reaction upon activation at a predetermined temperature which reaction is devoid of gaseous by-products and results in reaction products of no greater volume than the volume of the reactants. Suitable chemical reactants include at least one compound selected from the group consisting of alkali metal chlorates and alkali metal perchlorates preferably uniformly admixed with a reducing metal. The chlorates and perchlorates when mixed with reducing metals decompose in a continuous reaction when exposed to a firing temperature to produce oxygen which then immediately reacts with the surplus of reducing metal used in a highly exothermic reaction. For example, when potassium perchlorate $KClO_3$ is uniformly admixed with a stoichiometric excess of boron and heated to a predetermined peak temperature a highly exothermic, non-gas producing reaction occurs which evolves thermal energy in accordance with the following equation:

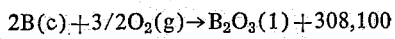

$$2B(c) + 3/2 O_2(g) \rightarrow B_2O_3(l) + 308,100$$

gm. cal./mole at 723° to 2000° K. and

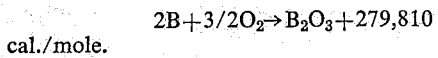

$$2B + 3/2 O_2 \rightarrow B_2O_3 + 279,810$$

cal./mole.

In effect, the chlorate or perchlorate is a very efficient high density storage medium for oxygen and in fact stores much more oxygen than cryogenic oxygen on a volumetric or weight storage basis (about 5 to 7 times as much). Moreover, reactions of this type form products which occupy no more volume and often less than the volume of the reactants, permitting a completely closed and sealed system since no gas is evolved which is not used in the reaction. Another chemical reaction suitable for use in heat source units of this invention is the reaction between magnesium and polytetrafluoroethylene which also produces highly exothermic reactions with heat outputs in the range of 4700 B.t.u. per pound and a firing temperature of 919° F.

In the preferred embodiment, a uniform mixture of finely divided aluminum potassium perchlorate is used. The reaction produces 4500 B.t.u. per pound evolving 426 B.t.u./cu. in. of mixture. The reactants are relatively stable with the aluminum melting at 1220° F. and the potassium perchlorate at 1090° F. Potassium perchlorate decomposes at a temperature slightly above its melting temperature with the potassium chloride produced melting at 1422° F. and boiling at 2565° F. The ignition temperature for mixtures of aluminum and potassium perchlorate is 1445° F. which is above the melting point of either of the reactants.

Other chemical reactants of particular interest in this invention comprise mixtures of lithium, sodium or potassium chlorate or perchlorate with vanadium, calcium, beryllium, iron, cobalt, cadmium, aluminum, boron and/or magnesium.

Figure 3:
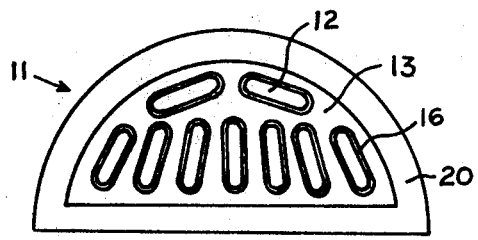
FIG. 3 is an end view of an element thereof.

The chemical reactants are preferably formed into elongated sticks of flattened cylindrical configuration having an oval cross section, as best shown in FIGS. 1 and 3, which comprise an outer high temperature resistant, highly heat conductive metal sheath 16 such as of copper, stainless steel or Hastealloy enclosing the mixture of reactants. The particular shape is chosen to provide greater heat transfer surface as opposed to that which would be jeopardized, for example, true cylinders. An electrical primer lead or contact, not shown, extends outwardly at one end of the sheath 16 for igniting the reactants. The means for igniting the reactants, that is, supplying a peak temperature to start the reaction can vary greatly. In the preferred form, a thermal spike is produced by use of a small battery interconnected with the primer leads and a control mechanism comprising activation circuitry, not shown, which is in turn interconnected with an ignition switch 19 of the device 10 (FIG. 1). These devices are commonly known as "electric matches." The igniting means is similar to that shown and described with respect to the embodiment of FIG. 8. Mechanical percussion caps and a variety of other known igniters are also useful in other embodiments of the invention.

The use of the heat units 12 in a cylindrical form is the simplest method of fabrication, filling and assembling a device in accordance with the present invention; however, to provide a greater heat transfer surface the configuration shown is preferred. The burning time of an elongated cylinder is relatively rapid but can be designed to have varying reaction times as by extending the length of the cylinder reducing the diameter of the cylinder or by forming the reaction path in spiral arrangements and the like. In many embodiments, it is not necessary to entirely contain the exothermic reaction products, but they can be allowed to be released into the surrounding salt bath since the reaction products themselves are often salts and metal oxides and this need not have a deleterious effect on the salt or heat storage medium. This enables very low cost containers of the heat stick materials to be utilized.

Characteristically the elongated heat units have a short burning time, that is, a high heat release rate. Thus, the system 10 incorporates mechanism for matching the heat release rate to a diver demand. This is accomplished by the use of a heat storage medium 13 which surrounds the heat units used in each module 11. The number of units 12 in each module can vary depending upon the total heat output desired and the particular chemical reactants used as is apparent to one skilled in the art.

The storage medium has a high heat of fusion, low density, high thermal conductivity and preferably a desirably low melting point. The melting point is low to prevent auto-ignition of unfired heat sticks which are preferably fired at different times by the control mechanism. In the preferred embodiment, the high heat of fusion material has a melting point below 1000° F. In addition the heat of fusion material is preferably inert to water, nontoxic, relatively nonreactive and provides no outgassing of materials.

A number of salts and eutectic salt mixtures can be used as the thermal energy storage medium 13. Preferably the melting points lie between 400° F. to 1000° F. for the heat of fusion material. Such material is preferably an alkali metal-halogen salt or alkali metal nitrate, oxides and hydroxides or eutectic mixtures of these salts. Lithium chloride is a good heat of fusion material for use in this invention, however, its melting point is not compatible with the ignition temperatures of some heat units 12 and it is sometimes desirable to obtain a heat storage material which has the heat of fusion of lithium chloride with a 500 or 600° F. melting point. An eutectic mixture of lithium chloride-lithium hydroxide is preferred for use as the heat storage medium in this invention. Quarternary eutectics of barium fluoride-potassium fluoride-lithium fluoride-sodium fluoride are also highly useful. These eutectic mixtures have melting points of 525° F. and 820° F. respectively and will carry out the required task with less than 7½ pounds of material in the system of this invention.

Other salts of interest for use by themselves or in eutectic mixtures are listed as follows:

|  | M.P. (° F.) | $\Delta H_f$ (B.t.u./lb.) |
|---|---|---|
| LiCl | 1,137 | 136 |
| KCl | 1,422 | 147 |
| NaCl | 1,474 | 209 |
| LiF | 1,558 | 449 |
| KF | 1,616 | 210 |
| NaF | 1,668 | 334 |

Particularly desirable eutectic salt mixtures for use in this invention are listed as follows where the compositions are given in mole percent:

|  | M.P. (° F.) | $\Delta H_f$ (B.t.u./lb.) |
|---|---|---|
| 34.5 LiCl-LiOH | 525 | 260 |
| 62 LiOH-36.5 LiCl-1.5 KCl | 540 | 248 |
| 7 KF-2.5 NaF-KNO$_3$ | 563 | 75 |
| 6.9 KCl-74.5 KNO$_3$-KClO$_3$ | 568 | 60 |
| 6.4 BaCl$_2$-39.4 KCl-LiCl | 608 | 140 |
| 20 KNO$_2$-KNO$_3$ | 613 | 60 |
| 13.1 KCl-KClO$_3$ | 653 | ? |
| 42 KCl-LiCl | 658 | 140 |
| 80 LiF-20 LiOH | 806 | 436 |
| 1.78 BaF$_2$-41.2 KF-45.7 LiF-11.3 NaF | 820 | 274 |
| 42 KF-46.5 LiF-11.5 NaF | 850 | 286 |
| 73.6 LiF-LiCl | 905 | 333 |
| 50 KF-LiCl | 909 | 284 |

A proper selection of the heat of fusion material can be made so that the required amount of salt for a particular boiler operating temperature in the system of this invention can be as little as 4.6 pounds.

The high heat of fusion material surrounds the heat units used with the number of heat units being designed for any particular application and in the preferred embodiment, 10 or more elongated heat units 12, are used each having a size of ¾" major diameter by ⅜" minor diameter by 12" long. An outer metal casing 20 preferably of the same material as the casing 16 is used to contain the reactants and the high heat of fusion material. Preferably each module 11 contains outer tubes, not shown, of the same material as the module casing 20 into which the heat units 12 can be slipped with suitable stops (not shown) provided to enable replacement of heat source units 12 after use to recharge the system.

In the preferred embodiment of the system 10, 40, heat units 12 are used in two modules of substantially semicircular shape each having a radius of 2½". Approximately 4 pounds of LiCl-LiOH high heat of fusion material fills each of the modules 11. This construction provides a heat output of 500 B.t.u. per heat stick or 1,000 B.t.u. for each D-shaped unit which provides this heat output over a total of 40 time periods by sequentially actuating each unit 12.

Figure 4:
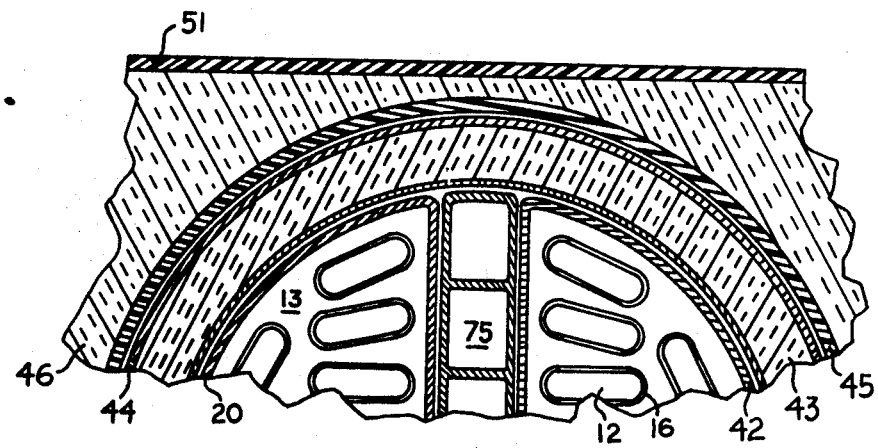
FIG. 4 is a partial cross sectional view through FIG. 1.

Refer now to FIG. 4. The two heat source modules 11 surround a flash boiler 75 and the modules 11 and boiler 75 are contained within an insulating cylinder 43 having an inner and outer metallic casing 42, 44, respectively. The insulation 43 may be evacuated. This structure is contained within an inner liner 45 which is preferably of epoxy glass fiber construction. The entire unit is situated within an outer housing 51, having rigid foam 46 intermediate the containers 45 and 51.

Turning now to the means for transferring the heat stored by the high heat of fusion material to a conventional liquid loop undergarment of a diver's suit indicated at 14 (FIG. 2), the modules 11 are positioned around a conventional flash boiler 75 in a fluid system having a recirculating liquid conduit loop 23 of conventional conduits and a steam loop 24. A steam injector pump 25 is provided in the fluid conduit system for pumping liquid into the diver's suit in a continuous circuit (which is connected through suitable quick disconnect fittings 26 and 27 shown in FIG. 1). The fluid is preferably water although other heat transfer fluids can be used. A flat plate cooler 28 may be connected across an inlet fluid line through a proportioning valve 29 controlled by a temperature sensor 30. This cooler 28 will protect the diver from over temperature in case of malfunction of the temperature sensor 40. A second temperature sensor 40 controls the rate of feed water taken from the liquid loop 23 and passed to the flash boiler 75.

The flash boiler 75 can be of conventional design. Water passing through the flash boiler is heated to steam which steam carries excess heat generated by the modules 11. Water and steam flow through the flash boiler as indicated by the arrows shown in FIG. 2. The use of a flash boiler better affects the transfer of heat from the source and heat media to the suit water since a small portion of the suit water flow can be diverted to the boiler and there flashed to steam and spuerheated. The steam is subsequently mixed with the main suit water flow in circuit 23 to raise the over-all temperature of the water to a required level. Because of the large heat storage capacities of superheated steam, the amount of water to be diverted to the boiler can be less than 2% of the suit flow. Thus water entering the aflsh boiler undergoes heating up to its boiling point and acquires a latent heat of vaporization in the boiling process with the resulting steam being further superheated to the temperature of the boiler. The heat content or enthalpy of the steam is indicated as $h = h_v - h_1$ B.t.u./lb. The heat values derived from the above equation are related to pressure and preferably the boiler is operated at ambient pressure which varies from less than 20 to greater than 120 pounds per square inch as the unit is used from surface to greater than 200 foot depth. For these two extremes of pressure and when operating with a fluid such as water that enters the boiler at 95° F. and exists as superheated steam at 525° F.

$$\Delta h_{120}\ \text{p.s.i.a.} = 1290 - 67 = 1223\ \text{B.t.u./lb.}$$

$$\Delta h_{20}\ \text{p.s.i.a.} = 1299 - 67 = 1232\ \text{B.t.u./lb.}$$

Thus, for modest pressure variations as described, the heat content of the steam emerging from the boiler has a temperature and enthalpy which is essentially constant regardless of the fact that boiling takes place at 336° F. and 230° F. for pressures of 120 and 20 pounds per square inch respectively. Thus, heat delivery to the diver can be easily controlled by regulating water flow to the boiler.

If the maximum heating rate required by the diver is 4000 B.t.u. per hour and a minimum sustaining heat flow is 400 B.t.u. per hour the heat content H of the steam emerging from the boiler is approximately 1225 B.t.u. per pound since the heating rate is given by:

$$Q = \dot{M}_{\text{boiler}}$$

the mass flow rates can be obtained thusly:

$$\dot{M}_{\text{boiler}}\ \text{Max} = \frac{Q_{\max}}{H} = \frac{(4000)\ \text{B.t.u./hr.}}{(1225)\ \text{B.t.u./lb.}}$$

$$= 3.27\ \text{lb./hr.} = .00654\ \text{g.p.m.}$$

thus $$\dot{M}_{\text{boiler}}\ \text{Min} = \frac{Q_{\min}}{H} = \frac{(400)\ \text{B.t.u./hr.}}{(1225)\ \text{B.t.u./lb.}}$$

$$= .327\ \text{lb./hr.} = 000654\ \text{g.p.m}$$

The volume of steam generated at these flow rates is proportional to the pressure in the boiler and is tabulated below:

| Pressure | Specific volume, ft.³/lb. | Steam flow, ft.³/lb. $\dot{V}_{max.}$ | $\dot{V}_{min.}$ |
|---|---|---|---|
| 20 p.s.i.a | 20 | 65.4 | 6.54 |
| 120 p.s.i.a | 4 | 13.1 | 1.31 |

For this analysis, the return water temperature (nominally suit exit temperature) has been set at 95° F. If the maximum temperature entering the suit is limited to a figure such as 120° F. to prevent burning of the diver, the fluid flow through the suit is given by $$M_{suit} = \frac{Q}{C_p \Delta T} = \frac{(4000) \text{ B.t.u./hr.}}{(1) \text{ B.t.u./lb. }° F. (25)° F.}$$

$$= 160 \text{ lb./hr.} = .32 \text{ g.p.m.}$$

In the preferred embodiment, the steam is used not only to heat the water in the loop 23 but also to provide a pumping action eliminating the need for electrically or other operated pump systems. This can easily be done by using known principles and a known steam injector pump of the type shown at 25. In operation, the steam enters the ejector of the pump and produces a high velocity steam jet. This jet creates a vacuum in a suction line causing water in the loop 23 to be drawn in where it is entrained by the steam. Steam and water are mixed in a diffuser and discharged against the back pressure. Thus, the condensing steam provides feed water heating for the liquid loop 23 as well as pumping action.

In the specific embodiment, the maximum steam flow required for the highest heating rate is 3.27 pounds per hour. If we have a 25° F. maximum differential through the suit, the maximum suit flow would be 160 pounds per hour. This flow ratio is within the capability of known steam injectors operating at design points. The flow required is preferably obtained from a single steam injector pump however two or more units with control ranges of 5 to 1 which are known in the art can be used and connected to the liquid loop. Control is obtained by setting the design point of the steam injector pump or pumps used to obtain the highest required liquid flow rate and the flow rate is controlled by varying steam water feed through the line 22 as desired.

The flat plate cooler 28 is of a known type having a liquid loop in direct contact with a flat plate 31 shown in FIG. 1 mounted on the outside of the unit exposed to surrounding sea water in use.

The temperature sensor 30 is adjusted to provide a predetermined maximum temperature to the liquid loop by varying the amount of water passed to the flat plate cooler through the conventional proportioning valve 29. Similarly, water flow through the boiler and thus ultimate temperature control is obtained by a temperature sensor 40 which controls the amount of water fed to the boiler through the feed water control valve 41 of conventional design. Valve 29 is a three-way proportional control valve, valve 41 is a needle valve for low flow proportional control and temperature sensors 30 and 40 are proportional sensors employing the volume change vs. temperature characteristics of a fluid or a wax compound.

In some cases, an auxiliary feed water pump 100 of the steam injector type can be interconnected just before the flow control 41 with a steam feed, off line 24 to increase the pumping pressure to the boiler.

In operation of the system 10, the ignition switch 19 is turned to an on position which causes predetermined sequential firing of the heat stick units. The salt surrounding the flash boiler is then heated by the heat produced. The control point at sensor 40 senses the temperature of the exit stream of the diving suit. As the diver's heat demand increases, the exit temperature will decrease. The system is primed by injecting a first amount of water into the boiler by manually depressing a primer 18. Heat input to the system is thus increased and thereafter automatically maintained.

Heat input to the water is in the form of steam. The control system then regulates the amount of heat added to the water by controlling the amount of boiler water which is converted to steam. A needle valve type of boiler feed control 41 directly coupled to the temperature sensor 40 determines the amount of water fed to the boiler. The amount of steam generated affects the action of the steam ejector pump 25 so that as heat input decreases, liquid flow in the loop 23 also decreases. The tendency to increase flow with increasing heat input results in a stabilizing of the suit input temperature throughout the range of heat demands thus minimizing the likelihood of exposing the diver to discomfort or possible hazard of too warm water in the suit inlet.

The increase in boiler feed water in response to a heat demand signal from the sensor 40 results in generation of more steam in the boiler. The pressure rises as a result and causes greater flow through the ejector 25. The flow characteristics of the ejector 25 is not exactly linear in the control range but is of no consequence since the heat delivery is of primary significance. A response to the doubling of the boiler flow which alters suit flow by a factor of only 1.8 will sufficiently heat the suit water.

Since there is no fluid flow in the system at the start, there is a uniform pressure throughout the system. Thus a check valve 50 is provided so that water cannot enter the boiler when the unit is inoperative. If there is water in the boiler at the start of operation, beyond the desired filling of the boiler, a sudden expansion could occur. Preferably a relief valve (not shown) is used in the boiler.

To initiate flow, some water can be originally placed within the boiler or a primer 18 can be used. For example, a small bellows which dispenses an initial charge of water to the boiler can be provided connected with the line 22 and bypassing the feed water flow control. The bellows can be actuated by manual pressure if desired.

Preferably the system 10 is enclosed by an outer fiberglass or metal pressure resistant casing 51, FIG. 1 having a rear cover 52 which can be removed to replace heat units when desired.

Figure 5:
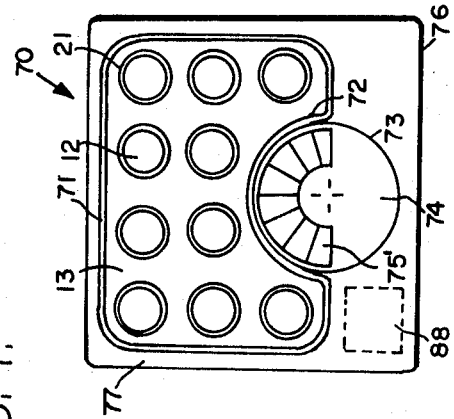
FIG. 5 is a cross sectional view through an alternate embodiment of a heat source system.
Figure 7:
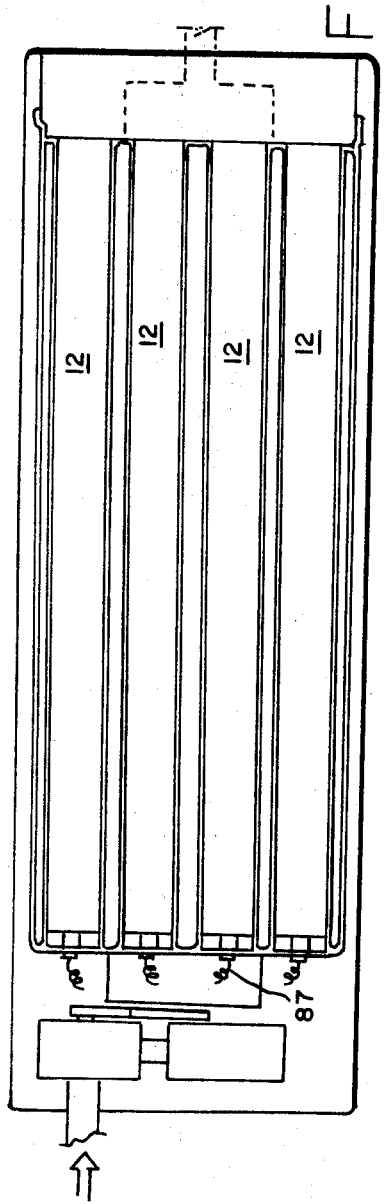
FIG. 7 is a semidiagrammatic top view thereof.
Figure 6:
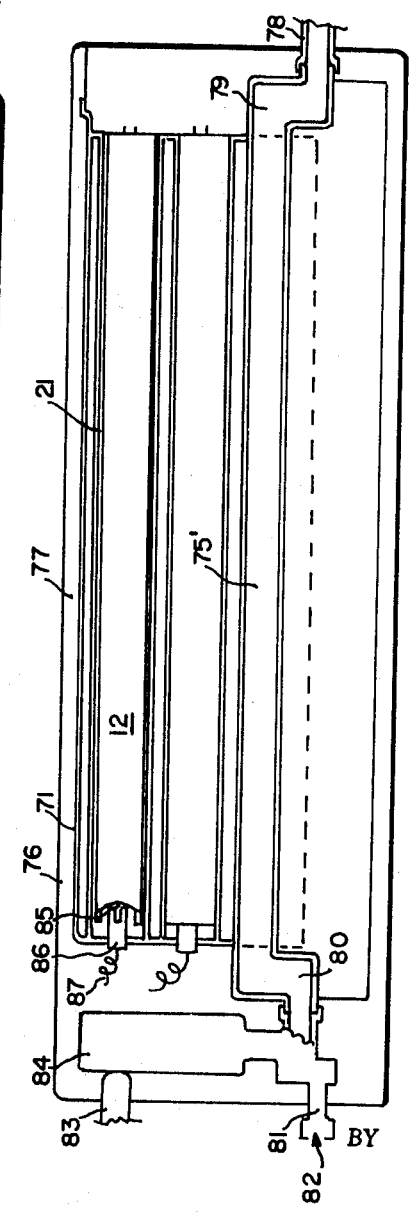
FIG. 6 is a semidiagrammatic side view of the embodiment of FIG. 5.

Turning now to an alternate embodiment of the invention as illustrated in FIGS. 5, 6 and 7, a system is shown at 70 for providing heat directly to a fluid such as water for use in a diver's suit or in other applications where liquid loop heating devices are useful. In this embodiment, cylindrical heat units 12 as previously described are mounted in an enclosed module 71 formed of a high temperature resistant metal such as steel or steel alloys. The heat sticks are mounted in metallic tubes 21 having an opening at one end of the module 71. The high heat of fusion material 13 as previously described is used surrounding the heat units. A semicircular elongated trough 72 is provided against which is mounted a passageway tube 73 insulated on one side at 74 and having a plurality of water conduits 75' passing from end to end of the unit. An outer casing 76 surrounds the module and is filled with insulation 77. An exit end of the water passageways is provided at 78 through a plenum 79. An inlet plenum 80 is connected through an inlet passageway 81 having a check valve 82. A second inlet passageway 83 is provided with an electrically driven pump 84 for pumping fluid through the passageway 75'. The heat units 12 have electrical actuator wires 85 passing out of the module casing 71 through a suitable insulated electrically conductive plug 86 interconnected with circuitry illustrated at 87 having a small ignition battery 88 mounted in a corner of the casing. An on-off switch (not shown) allows manual ignition of each of the heat units 12. Ignition can be accomplished with the heat units being fired in automatic timed or temperature controlled sequence or individually by manual initiation, depending upon the control circuitry 87 used. The pump 84 can be run off of electricity supplied by the ignition battery 88 if desired. Alternately, suitable drive means such as battery power and a motor for the pump 84 can be provided.

The embodiment 70 is suitable for use in a wide variety of applications as previously noted.

In a modification 91 of the embodiment 70, the heat units 12 are modified by incorporation therein of a thermally actuated battery 90 as shown in FIG. 8. Heat unit 91 comprises a mixture of the chemical reactants 92 noted above with respect to heat units 12. For example, the chemical reactant 92 can be a mixture of finely divided aluminum and potassium perchlorate. In some cases, the battery 90 can be surrounded by a high heat of fusion material as previously described. The high heat of fusion material can be contained in a cylindrical enclosure (not shown) separating the material 92 from the battery 90.

As more clearly seen in embodiment 91, but also used in the other heat units of this invention, the casing 16 has at one end, a primer ignition material 93 which can be ignited by means of a small ignition battery connected through wire or contact 94, grounded wire 95, with the contact 94 being insulated from the container casing by an insulating lead-through 96. Located axially within the cylindrical heat unit 91 is a thermal battery 90 preferably in an elongated form having an electrical lead 94' passing out of the casing in the same manner as contact 94. When the heat unit 91 is fired as by electrical application to flash the ignition powder 93 and bring the starting end of the reactants to ignition temperature, the reaction proceeds axially from left to right. As the reaction proceeds, the exothermic reaction heats the battery 90 to provide an electrical output at the lead 94'. Suitable thermal batteries include fused salt electrolyte batteries of the type commonly used for projectile arming fuses which consist of nickel cathodes, calcium anodes and bromide or chloride salt electrolytes with interposed depolarizer materials.

In still another embodiment of the invention, the outer casing of a module 11 which can be considered a heater can be used to apply heat at a controlled rate as desired. For example, the surface of the module 11 can be fitted with thermoelectric elements such as germanium silicon or lead-telluride, exposed at one end to the high temperature of the heat source molten salt container and at the other end to the surrounding cold environment, thus utilizing the Seebeck thermoelectric effect to generate electric power when required for system use.

The heat units of the type shown at 91 can be used in a diver system of the type indicated at 10 when no steam injector pump is used. Thus, the battery 90 can be used to power an electrically operated pump to pump fluid within the system while the steam produced at the flash boiler 22 is used merely to heat the liquid in the loop 23.

While specific embodiments of the present invention have been shown and described, it should be understood that many variations thereof are possible. For example, the configuration, size and mounting means for the heat modules and units can vary greatly in accordance with the required design considerations. Similarly the amounts of materials and sizes of components and the like may also vary greatly in accordance with design considerations for a particular use. The outer container and packaging for systems of the present invention are dependent upon particular use although an optimum package size and configuration has been disclosed in the description of FIG. 1.

The units shown have been designed for primary use as heating sources to provide thermal comfort for swimmers, divers and other persons exposed to thermal cold. The units substantially as described can also be usefully employed to provide therapeutic thermal treatment to patients requiring hyperthermy to soothe and accelerate healing of bruised or injured tissues. It can readily be seen however, that the subject invention can also be used to provide uniform thermal environment for inanimate objects requiring controlled warmth such as instrument packages or chemicals. It can also be seen that the subject invention as a heat source and as a constant temperature superheated steam source can be used to provide electric power primarily rather than incidentally, by use of thermal battery methods described, thermoelectric Seeback effect or by use of Rankine type engines. The inventors also anticipate use of this invention for providing propulsive power for underwater vehicles of modest mission duration, such as swimmer delivery vehicles, deep submergence vehicle emergency power and the like. The invention is particularly useful wherever heat and power are both needed.

What is claimed is:

1. A storable heating system comprising,
    a heat source comprising a mass of chemical reactants selected to provide a highly exothermic reaction upon activation by a predetermined temperature, which reaction is devoid of gaseous by-products and results in a reaction product of volume no greater than the volume of said reactants,
    a high heat of fusion material surrounding said mass acting as a thermal storage means in good heat transfer relationship with said mass,
    and means in operative relationship with said high heat of fusion material for transferring heat from said material to a heat using system.

2. A storable heating system in accordance with claim 1 wherein said reactants comprise at least one compound selected from the group consisting of alkali metal chlorates and alkali metal perchlorates mixed with a reducing metal.

3. A storable heating system in accordance with claim 1 wherein said reactants are polytetrafluoroethylene and a reducing metal.

4. A storable heating system in accordance with claim 2 wherein said high heat of fusion material is selected from the group consisting of alkali metal-halogen salts, alkali metal nitrates, oxides, hydroxides and mixtures of said salts.

5. A storable heating system in accordance with claim 1 wherein said last-mentioned means comprises a steam injector pump for pumping a moving fluid.

6. A storable heating system in accordance with claim 2 wherein said last-mentioned means comprises a steam injector pump for pumping a moving fluid.

7. A storable heating system in accordance with claim 1 and further comprising said last-mentioned means comprising a flash boiler,
    a steam injector pump,
    and conduit means interconnecting said boiler and steam injector pump.

8. A storable heating system in accordance with claim 7 and further comprising a liquid circuit for recirculating liquid to a heat user,
    a steam circuit for heating said liquid in said liquid circuit and pumping said liquid,
    cooling means interconnected with said liquid circuit,
    and control means for sensing temperature at preselected points in said liquid circuit to selectively control temperature at a predetermined point in said liquid circuit by adjusting liquid flow through said cooler and said boiler.

9. A storable heating system in accordance with claim 8 wherein said control means comprises a pair of temperature sensors and a pair of proportioning valves.

10. A storable heating system in accordance with claim 9 wherein said flash boiler surrounds said high heat of fusion material.

11. A storable heating system in accordance with claim 9 and further comprising a pump for directing flow of liquid from said liquid loop to said flash boiler.

12. A storable heating system in accordance with claim 1 and further comprising said last-mentioned means comprising a flash boiler,
a pump,
and conduit means interconnecting said boiler and pump.

13. A storable heating system in accordance with claim 12 and further comprising a liquid circuit for recirculating liquid to a heat user,
a steam circuit for heating said liquid in said liquid circuit and pumping said liquid,
cooling means interconnected with said liquid circuit,
and control means for sensing temperature at preselected points in said liquid circuit to selectively control temperature at a predetermined point in said liquid circuit by adjusting liquid flow through said cooler and said boiler.

14. A storable heating system in accordance with claim 12 wherein said control means comprises a pair of temperature sensors and a pair of proportioning valves.

15. A storage heating system in accordance with claim 12 wherein said flash boiler is surrounded by said high heat of fusion material.

16. A storable heating system in accordance with claim 12 and further comprising a pump for directing flow of liquid from said liquid loop to said flash boiler.

17. A heat source for use in heating where a high heat density controlled heat rate output is required,
said heat source comprising,
a high thermal conductivity casing,
a mass of chemical reactants in said casing with said reactants providing a highly exothermic reaction upon activation by a predetermined temperature which reaction is devoid of any gaseous by-products and results in reaction products having a volume no greater than the volume of said reactants,
a high heat of fusion material in operative conductive heat transfer relationship with said reactants and with said casing,
means for initiation of said chemical reaction,
a second casing surrounding said high heat of fusion material,
said second casing permitting insertion and removal of said reactants in said first-mentioned casing.

18. A heat source in accordance with claim 17 and further comprising said high heat of fusion material being a eutectic salt formation.

19. A heat source for use in heating where high heat density controlled heat rate output is required, said heat source comprising,
an elongated mass of chemical reactants with said reactants providing a highly exothermic reaction upon activation by a predetermined temperature which reaction is devoid of any gaseous by-products and results in reaction products having a volume no greater than the volume of said reactants,
an elongated thermal battery positioned in operative relationship with said elongated mass of chemical reactants whereby progression of said reaction from one end of said mass to the other results in progressive activation of said battery.

20. A heat source module for use in heating where high heat density controlled heat rate output is desired, said module comprising,
a mass of chemical reactants with said reactants providing a highly exothermic reaction upon activation by a predetermined temperature,
high temperature resistant, heat conductive casing surrounding said mass of chemical reactants,
means for activating said chemical reactants,
a second mass of a high heat of fusion material surrounding said first casing,
and a second casing surrounding said mass of high heat of fusion material.

21. A heat source module in accordance with claim 20 wherein said high heat of fusion material is a eutectic formulation.

22. A heat source module in accordance with claim 20 wherein said second casing is operatively associated with a heat user.

23. A heat source module in accordance with claim 22 wherein means are provided for passing a heat transfer fluid in operative relationship with said high heat of fusion material and delivering said heat transfer fluid to said heat user.

24. A heat source module in accordance with claim 21 wherein said eutectic is selected from the group consisting of
lithium chloride-lithium hydroxide,
lithium hydroxide-lithium chloride-potassium chloride,
potassium fluoride-sodium fluoride-potassium nitrate,
potassium chloride-potassium nitrate-potassium chlorate,
barium chloride-potassium chloride-lithium chloride,
potassium nitride-potassium nitrate,
potassium chloride-potassium chlorate,
potassium chloride-lithium chloride,
lithium fluoride-lithium hydroxide,
barium fluoride-potassium fluoride-lithium fluoride-sodium fluoride,
potassium fluoride-lithium fluoride-sodium fluoride,
lithium fluoride-lithium chloride,
potassium fluoride-lithium chloride.

References Cited

UNITED STATES PATENTS

| | | | |
|---|---|---|---|
| 3,400,249 | 9/1968 | Mekjean et al. | 126—400X |
| 3,450,127 | 6/1969 | Harwood | 126—204 |
| 3,485,216 | 12/1969 | Lawrence | 126—400X |
| 3,513,824 | 5/1970 | Fitzgerald et al. | 126—204 |
| 3,563,226 | 2/1971 | Rockenfeller et al. | 126—263X |

CHARLES J. MYHRE, Primary Examiner

U.S. Cl. X.R.
126—204, 400